(12) United States Patent
Debnath et al.

(10) Patent No.: US 11,610,436 B2
(45) Date of Patent: Mar. 21, 2023

(54) EFFICIENT WATCHLIST SEARCHING WITH NORMALIZED SIMILARITY

(71) Applicant: NEC Laboratories America, Inc., Princeton, NJ (US)

(72) Inventors: Biplob Debnath, Princeton, NJ (US); Srimat Chakradhar, Manalapan, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/197,431

(22) Filed: Mar. 10, 2021

(65) Prior Publication Data

US 2021/0319212 A1 Oct. 14, 2021

Related U.S. Application Data

(60) Provisional application No. 63/006,755, filed on Apr. 8, 2020.

(51) Int. Cl.
*G06V 40/16* (2022.01)
*G06K 9/62* (2022.01)
(Continued)

(52) U.S. Cl.
CPC ......... *G06V 40/172* (2022.01); *G06K 9/6215* (2013.01); *G06V 20/52* (2022.01);
(Continued)

(58) Field of Classification Search
CPC .... G06V 40/172; G06V 20/52; G06V 40/168; G06V 40/50; G06V 20/41; G06V 40/176; G06V 40/165; G06V 40/167; G06V 40/174; G06V 10/17; G06V 40/193; G06V 40/103; G06V 40/15; G06V 40/20; G06V 40/70; G06V 40/10; G06V 40/16; G06V 40/161; G06V 40/169; G06V 40/1365; G06K 9/6215; G06K 9/6269; G06K 9/6256; G06K 9/6267; G06K 9/00; G06K 9/6268; G06K 9/6201; G06K 9/6218; G06K 9/6292; G06K 9/6272; G08B 21/182; G08B 3/10;
(Continued)

(56) References Cited

U.S. PATENT DOCUMENTS 7,860,347 B2  12/2010  Tang et al.
8,311,341 B1 * 11/2012  Podilchuk ............ G06K 9/6201
                                             382/209
(Continued)

OTHER PUBLICATIONS

Barnes, Tavian., "The Approximating and Eliminating Search Algorithm", Tavianator, https://tavianator.com/2016/aesa.html. Mar. 15, 2016, pp. 1-4.
(Continued)

*Primary Examiner* — Nimesh Patel
(74) *Attorney, Agent, or Firm* — Joseph Kolodka

(57) ABSTRACT

Methods and systems for face recognition and response include extracting a face image from a video stream. A pre-processed index is searched for a watchlist image that matches the face image, based on a similarity distance that is computed from a normalized similarity score to satisfy metric properties. The index of the watchlist includes similarity distances between face images stored in the watchlist. An action is performed responsive to a determination that the extracted face image matches the watchlist image.

14 Claims, 5 Drawing Sheets

(51) Int. Cl.
*G06V 20/52* (2022.01)
*G06V 40/50* (2022.01)
*G08B 21/18* (2006.01)

(52) U.S. Cl.
CPC ............ *G06V 40/168* (2022.01); *G06V 40/50* (2022.01); *G08B 21/182* (2013.01)

(58) Field of Classification Search
CPC ........... H04N 1/00381; H04N 1/00437; H04N 5/23219; H04N 5/23238; G06Q 30/0631; G06Q 50/01; G06Q 30/0643; G06Q 30/0282; G06Q 30/06; G06Q 30/0277; G06Q 30/0281; G06Q 30/0627; G06Q 30/0253; G06Q 30/0254; G06Q 30/0267; G06Q 30/0637; G06N 3/0454; G06N 20/00; G06N 3/08; G06N 3/04; G06N 3/004; G06N 3/008; G06N 5/022; G06N 5/003; G06F 3/011; G06F 2203/011; G06F 40/30; G06F 3/012; G06F 16/436; G06F 21/32; G06F 3/015; G06F 3/0482; G06F 3/048; G06F 16/54; G06F 3/0481; G06F 3/01; G06F 21/36; H04M 1/72454; H04M 2250/52; H04M 1/72463

See application file for complete search history.

(56) References Cited

U.S. PATENT DOCUMENTS

| | | | |
|---|---|---|---|
| 8,515,139 B1* | 8/2013 | Nechyba | G06K 9/6256 382/118 |
| 2012/0039514 A1* | 2/2012 | Sun | G06V 40/173 382/118 |
| 2013/0110666 A1* | 5/2013 | Aubrey | G06V 40/103 705/26.5 |
| 2016/0132720 A1* | 5/2016 | Klare | G06K 9/6215 382/118 |
| 2016/0299920 A1* | 10/2016 | Feng | G06V 20/40 |
| 2017/0262695 A1* | 9/2017 | Ahmed | G06V 10/82 |
| 2018/0330152 A1* | 11/2018 | Mittelstaedt | G06V 40/167 |
| 2019/0130202 A1* | 5/2019 | Doumbouya | G06N 3/084 |
| 2021/0134062 A1* | 5/2021 | Joseph | G06N 3/0454 |

OTHER PUBLICATIONS

Kumar N., et al., "A Search Engine for Large Collections of Images with Faces", European conference on computer vision. Oct. 12, 2008, pp. 1-14.
Wang, Dayong, et al., "Face Search at Scale", IEEE Transactions on Pattern Analysis and Machine Intelligence vol. 39, No. 6. Jun. 2017, pp. 1122-1136.
Enrique Vidal Ruiz., "An Algorithm for Finding Nearest Neighbours in (approximately) Constant Average Time", Pattern Recognition Letters, vol. 4, Issue 3, Elsevier Science Publishers B.V. Jul. 1986, pp. 145-157.

* cited by examiner

EFFICIENT WATCHLIST SEARCHING WITH NORMALIZED SIMILARITY

RELATED APPLICATION INFORMATION

This application claims priority to 63/006,755, filed on Apr. 8, 2020, is incorporated herein by reference in its entirety.

BACKGROUND

Technical Field

The present invention relates to video analytics, and, more particularly, to searching video streams for individuals on a watchlist.

Description of the Related Art

Performing authentication of individuals in a large facility is challenging, particularly in contexts like stadiums, where there are areas where the general public is permitted and areas where only authorized personnel are permitted. Large numbers of people may need to be checked for access in real time. In addition, searching a large database of individuals can be time consuming, particularly when such a search needs to be performed for each new person who is detected in a video stream.

SUMMARY

A method for face recognition and response includes extracting a face image from a video stream. A pre-processed index is searched for a watchlist image that matches the face image, based on a similarity distance that is computed from a normalized similarity score to satisfy metric properties. The index of the watchlist includes similarity distances between face images stored in the watchlist. An action is performed responsive to a determination that the extracted face image matches the watchlist image.

A system for face recognition and response includes a hardware processor a memory. The memory stores a computer program product, which, when executed by the hardware processor, causes the hardware processor to extract a face image from a video stream, search a pre-processed index for a watchlist image that matches the face image, based on a similarity distance that is computed from a normalized similarity score to satisfy metric properties, and perform an action responsive to a determination that the extracted face image matches the watchlist image. The index of the watchlist includes similarity distances between face images stored in the watchlist.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To increase the efficiency of searching for a match in a watchlist, an approximating search may be used to provide searching with better-than-linear speed. However, in the event that the similarity metric is a black box function, then it may not be possible to ensure that the similarity metric has the properties needed for the approximating search. To address this, similarity scores generated by the black box similarity metric may be normalized, making them suitable for use with the approximating search. In addition, the watchlist may be partitioned, substantially reducing the amount of space needed for the approximating search.

Figure 1:
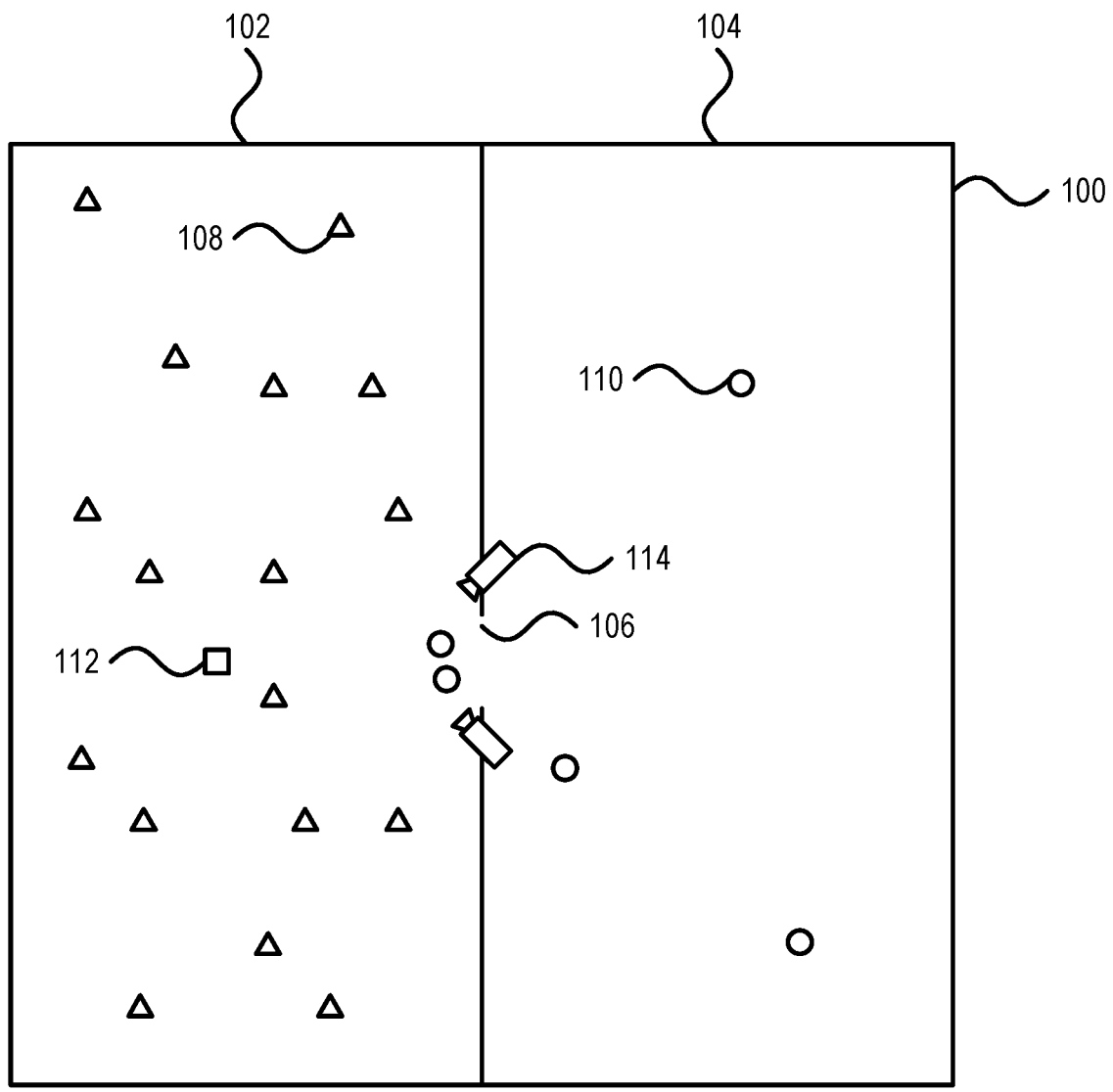
FIG. 1 is a diagram of an environment that is monitored by video cameras, where facial recognition may be used to identify individuals in a watchlist, in accordance with an embodiment of the present invention.

Referring now to FIG. 1, an exemplary monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is a banned individual 112, shown as a square. The unauthorized individuals 108 are permitted access to the uncontrolled region 102, but not to the controlled region 104. The authorized individuals are permitted access to both the uncontrolled region 102 and the controlled region 104. The banned individual 112 is not permitted access to either region.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104.

The video streams generated by the video cameras 114 may be processed to identify objects within the frames of the video streams. Although face detection is specifically described herein, it should be understood that any kind of processing may be performed, for example to identify vehicles, license plates, animals, etc. The detected object may be compared to objects in a watchlist. In the case of faces, a similarity metric may be used to compare a detected face from a frame of the video streams to a set of different faces that are stored in the watchlist.

A naïve approach to this matching may be to perform a linear search, matching each detected face to faces in the watchlist until a match is found. However, the average time to complete this linear search increases proportionally to the number of faces in the watchlist, which can consume a significant amount of time when the watchlist stores many faces.

To address this, an approximating search may be used, such as by the approximating and eliminating search algorithm (AESA). Such a search may use a pre-processed watchlist, for example consuming an amount of memory that scales with the square of the number of watchlist faces. Such a search may provide search results that average to constant time, regardless of the number of faces in the watchlist. Thus, such a search may dramatically increase the speed of searching through a large watchlist, at the expense of a large amount of memory usage.

However, an approximating search such as AESA may need a distance function to satisfy certain properties. In particular, the distance function may satisfy "metric" properties, such as the following:

Non-negativity: $d(x,y)=0$, if and only if $x=y$
Symmetry: $d(x,y)=d(y,x)$
Triangle inequality: $d(x,z) \leq d(x,y)+d(y,z)$ for all y In some circumstances, the similarity score that is used to match faces to one another, such as when a detected face is matched against faces in the watchlist, may be a black box function. In such circumstances, it may not be possible to verify that the similarity score satisfies the metric properties. This may occur when an off-the-shelf product is used to perform face matching, as the source code of the product may not be available.

Figure 2:
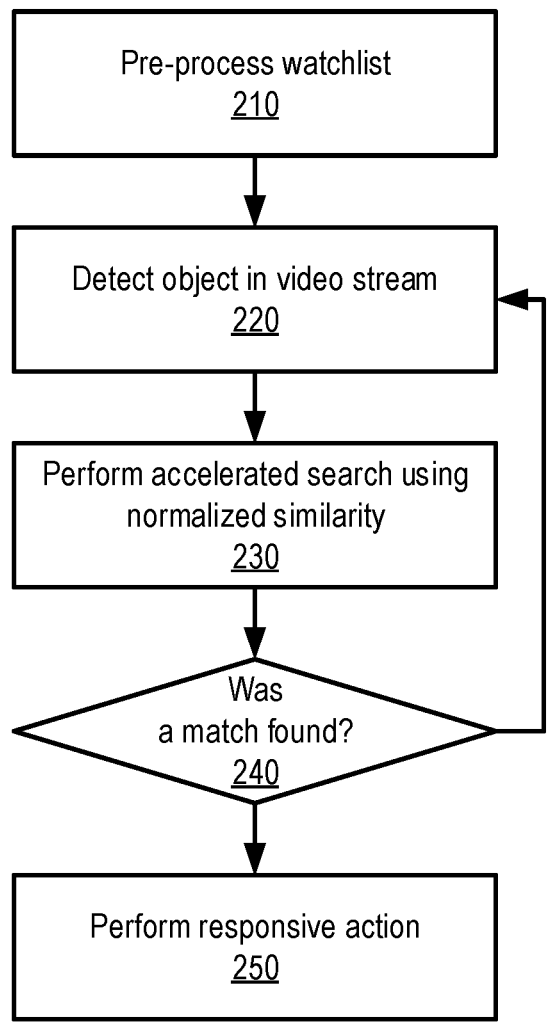
FIG. 2 is a block/flow diagram of a method for searching a watchlist for face images that are found in a video stream, and for performing a responsive action, in accordance with an embodiment of the present invention.

Referring now to FIG. 2, a method for performing an efficient watchlist search is shown. At block 210, a watchlist of faces is pre-processed. As noted above, faces are specifically contemplated and described herein, but it should be understood that other forms of object detection and comparison may be used instead.

As will be described in greater detail below, pre-processing the watchlist includes determining similarity distances between each pair of face images in the watchlist, based on a similarity score function that may generate scores according to some black box process. The pre-processing of block 210 may further include partitioning the watchlist into multiple different sections to generate indices. The partition size may be selected as a tradeoff between the size of the index (which grows with the square of the number of elements) and the number of searches (which grows with the number of partitions). For example, a partition size of about 1,000 may be used.

Block 220 detects an object, such as a person's face, in a video stream. This object detection may be performed on one or more frames from the video stream, and may identify a bounding box for the person's face. In this manner, an image of the person's face may be extracted from the video stream.

Block 230 performs an accelerated search, such as AESA, using the extracted face image and the pre-processed watchlist index. Although AESA is specifically described herein, it should be understood that any appropriate search may be used with the similarity distance. If there is a matching face image in the watchlist, then the accelerated search may be performed with $O(1)$ computational complexity. However, if there is no matching face, then the search may have a complexity of $O(m)$. This may occur in a case where there are many faces in a video stream that are not in the watchlist (e.g., in an environment that is open to the public). Additionally, even if there is a match somewhere in the watchlist, most of the partitions of the index may not include a match. To limit the computation in such cases, then the search process for each partition may be stopped after k iterations.

Block 240 determines whether a match was found. This may be determined by comparison of a similarity distance, calculated using the extracted face image and a matching face image from the watchlist, to a threshold. If a match is found, then block 250 performs a responsive action. If not, then processing returns to block 220 to detect another object in the video stream.

The response of block 250 may include, for example, alerting security personnel and logging the access. The response may include an automatic action that, for example, sounds an alarm, locks a door, changing the operational status of one or more machines, triggering an environmental control (e.g., turning on lights or air conditioning), engaging or disengaging a traffic control device, etc.

Figure 3:
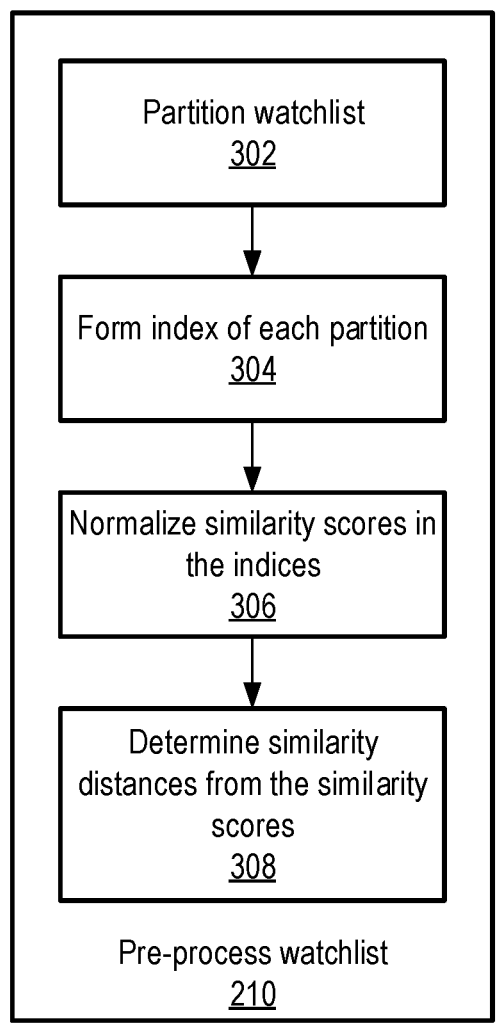
FIG. 3 is a block/flow diagram of a method for pre-processing a watchlist for accelerated searching, in accordance with an embodiment of the present invention.

Referring now to FIG. 3, additional detail on the watchlist pre-processing of block 210. For a watchlist that includes n different face images, the watchlist may be partitioned into smaller sub-groups of size m in block 302. This pre-processing may include the generation of an index that is compatible with AESA in block 304. This pre-processing may incur a number of similarity comparisons, between the different face images in each partition of the watchlist, that is proportional to $m^2$, e.g., $$\frac{n}{m} O(m^2).$$

The amount of space needed to accommodate the index may similarly scale with $m^2$. If the similarity scores are expressed using a double, then the space complexity may be $$8\left(\frac{n}{m}\right) O(m^2),$$

although this may be reduced to $$\frac{n}{m} O(m^2)$$

by using a byte instead of a double.

Pre-processing may further include normalization of the similarity scores in the index in block 306. For example, normalization may include scaling the entire range of detected similarity scores to a normalized similarity score $s(x,y)$, with x representing a first face image and y representing a second face image. The normalized similarity score may have a value between 0.0 and 1.0. In one exemplary normalization, the maximum similarity score of the similarity score function may be treated as 1.0. If the maximum similarity score for a particular similarity score function is not known, then it may be estimated by determining the similarity score for two identical face images. The maximum similarity score may be used as a scaling variable, with every similarity score in the index being divided by the scaling variable to provide a normalized similarity score that is between 0.0 and 1.0.

The normalized similarity scores may then be used to determine respective similarity distances in block 308, which are likely to satisfy the metric properties described above. The similarity distance may be expressed as $d(x,y)=\sqrt{1-s(x,y)^2}$. This similarity distance function satisfies the non-negativity and symmetric properties, and has been shown empirically to have a very high probability of satisfying the triangle inequality. The similarity distance is therefore suitable for use with an approximating search algorithm, such as AESA.

Figure 4:
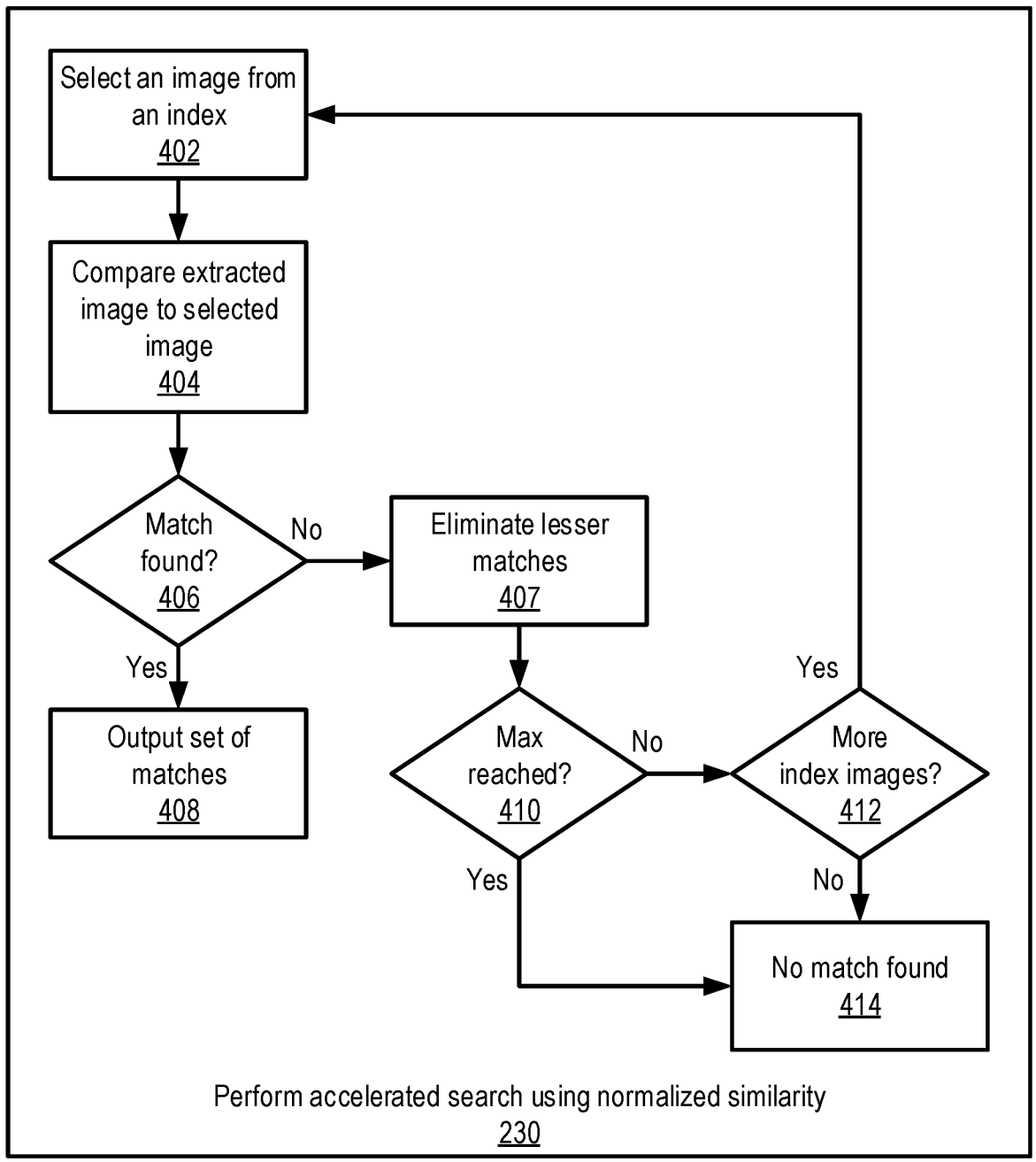
FIG. 4 is a block/flow diagram of an accelerated search process with a maximum number of iterations, in accordance with an embodiment of the present invention.

Referring now to FIG. 4, additional detail on an exemplary accelerated search for block 230 is shown. Block 402 selects an image from an index. If the watchlist was partitioned before indexing, then one of the indices may be selected, with block 230 being repeated for each indexed partition.

Block 404 performs a comparison of the extracted image, e.g. extracted from a video stream, to the selected image. This comparison may be performed using the black box similarity distance, computed as described above based on a normalized similarity score function using the extracted image and the selected image. Block 406 determines whether a match has been found. If so, block 408 outputs a set of matching images, including the selected image and any other images in the index that are sufficiently similar to the selected image.

If the selected face does not match the extracted face, then block 407 eliminate other faces from the index on the basis of their similarity to the selected face. Block 410 determines whether the maximum number of iterations k has been reached. If so, then the search ends on this index at block 414, with no match being found.

If the maximum number of iterations has not been reached, block 412 determines whether there are more images remaining, after the elimination of block 407. If not, then the search ends on this index at block 414, with no match being found. If additional images remain, then block 402 selects a new image from the index, from those images that remain after the elimination.

Thus, the search process proceeds iteratively, until either a match is found, all images in the index have been eliminated, or a maximum number of iterations has been reached. Thus, the search is guaranteed to terminate after a maximum number of iterations, with only small odds of a positive match being missed. The search may be repeated for every index of the partitioned watchlist, until all of the indices have been checked. This process may also be executed in parallel, with each index of the partitioned watchlist being searched independently.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
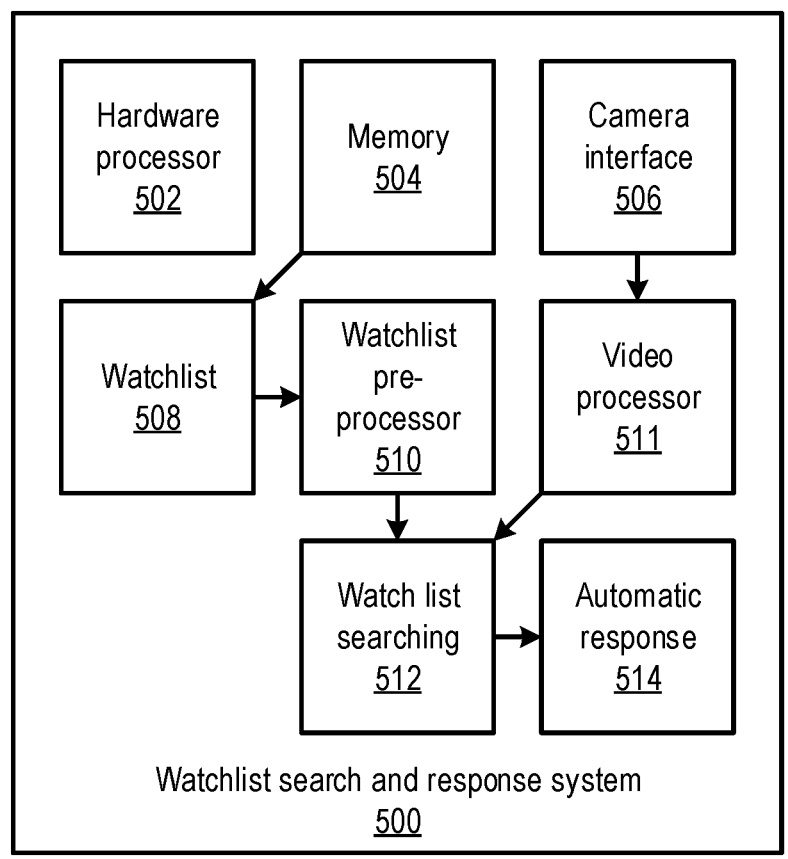
FIG. 5 is a block diagram of a watchlist search and response system, in accordance with an embodiment of the present invention.

Referring now to FIG. 5, watchlist search and response system 500 is shown. The system 500 includes hardware processor 502 and memory 504. The system 500 may further include one or more functional modules, each of which may be implemented as software that is stored in the memory 504 and executed by the hardware processor to perform their functions. One or more of the functional modules may be implemented as one or more discrete hardware components, for example in the form of ASICs or FPGAs.

A camera interface 506 receivers a video stream from a video camera 114. The camera interface 506 may receive the video stream from the video camera 114 directly, for example by a dedicated interface, or may receive the video stream via a computer network, in which case the camera interface 506 may include a network interface.

A watchlist 508 may be stored in the memory 504. The watchlist 508 may include a set of images of objects to be matched, such as face images. The face images in the watchlist 508 may be associated with identifying information, authentication information, alert response information, etc. For example, the watchlist 508 may include faces of individuals who are barred entry, and so may include information about an appropriate response level. The watchlist 508 may include faces of individuals who are permitted entry, with an access level being stored.

Watchlist pre-processor 510 generates an index based on the watchlist 508. The index may include a number of partitions to reduce overall index size. A video processor 511 processes the video stream that is received by the camera interface to perform an object detection, such as face detection. Video processor 511 extracts a face image from the video stream.

Watchlist searching 512 uses the watchlist index and a similarity distance, based on a normalized similarity score, to identify a face image in the watchlist 508 that matches the extracted face image. Based on this match, an automatic response 514 is performed. The automatic response 514 may include issuing instructions to another device to perform one or more instructive actions, as described above.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for face recognition and response, comprising:
   extracting a face image from a video stream;
   generating a pre-processed index by determining the similarity distances between face images stored in a watchlist, where a similarity distance (x,y) between a face image x and a face image y is based on a normalized similarity score s(x,y) as $d(x,y)=\sqrt{1-s(x,y)^2}$;
   searching a pre-processed index for a watchlist image that matches the face image, based on a similarity distance that is computed from a normalized similarity score to satisfy metric properties, wherein the index of the watchlist includes similarity distances between face images stored in the watchlist; and
   performing an action responsive to a determination that the extracted face image matches the watchlist image.

2. The method of claim 1, wherein generating the pre-processed index further includes partitioning the watchlist and generating respective indices for each partition.

3. The method of claim 1, wherein determining the normalized similarity scores further includes dividing each initial similarity score by a maximum similarity score.

4. The method of claim 3, wherein determining the normalized similarity scores further includes determining the maximum similarity score by a comparison of a face image with itself.

5. The method of claim 1, wherein searching a pre-processed index includes performing an approximating and eliminating search.

6. The method of claim 1, wherein searching the pre-processed index includes:
   searching the pre-processed index in a number of iterations; and halting the searching of the pre-processing index responsive to the determination that the number of steps has reached a maximum number of iterations.

7. The method of claim 1, wherein the action is selected from the group consisting of sounding an alarm, locking a door, changing the operational status of one or more machines, triggering an environmental control, and engaging or disengaging a traffic control device.

8. A method for face recognition and response, comprising:

a hardware processor; and a memory that stores a computer program product, which, when executed by the hardware processor, causes the hardware processor to:

extract a face image from a video stream;

generate a pre-processed index by determining the similarity distances between face images stored in a watchlist, where a similarity distance $(x,y)$ between a face image x and a face image y is based on a normalized similarity score $s(x,y)$ as $d(x,y) = \sqrt{1-s(x,y)^2}$;

search a pre-processed index for a watchlist image that matches the face image, based on a similarity distance that is computed from a normalized similarity score to satisfy metric properties, wherein the index of the watchlist includes similarity distances between face images stored in the watchlist; and perform an action responsive to a determination that the extracted face image matches the watchlist image.

9. The system of claim 8, wherein the computer program product further causes the hardware processor to partition the watchlist and generate respective indices for each partition.

10. The system of claim 8, wherein the computer program product further causes the hardware processor to divide each initial similarity score by a maximum similarity score to generate the normalized similarity scores.

11. The system of claim 10, wherein the computer program product further causes the hardware processor to determine the maximum similarity score by a comparison of a face image with itself.

12. The system of claim 8, the search of the pre-processed index includes an approximating and eliminating search.

13. The system of claim 8, wherein the computer program product further causes the hardware processor to search the pre-processed index in a number of iterations, and to halt search of the pre-processing index responsive to the determination that the number of steps has reached a maximum number of iterations.

14. The system of claim 8, wherein the action is selected from the group consisting of sounding an alarm, locking a door, changing the operational status of one or more machines, triggering an environmental control, and engaging or disengaging a traffic control device.

* * * * *